Figures 1, 2:
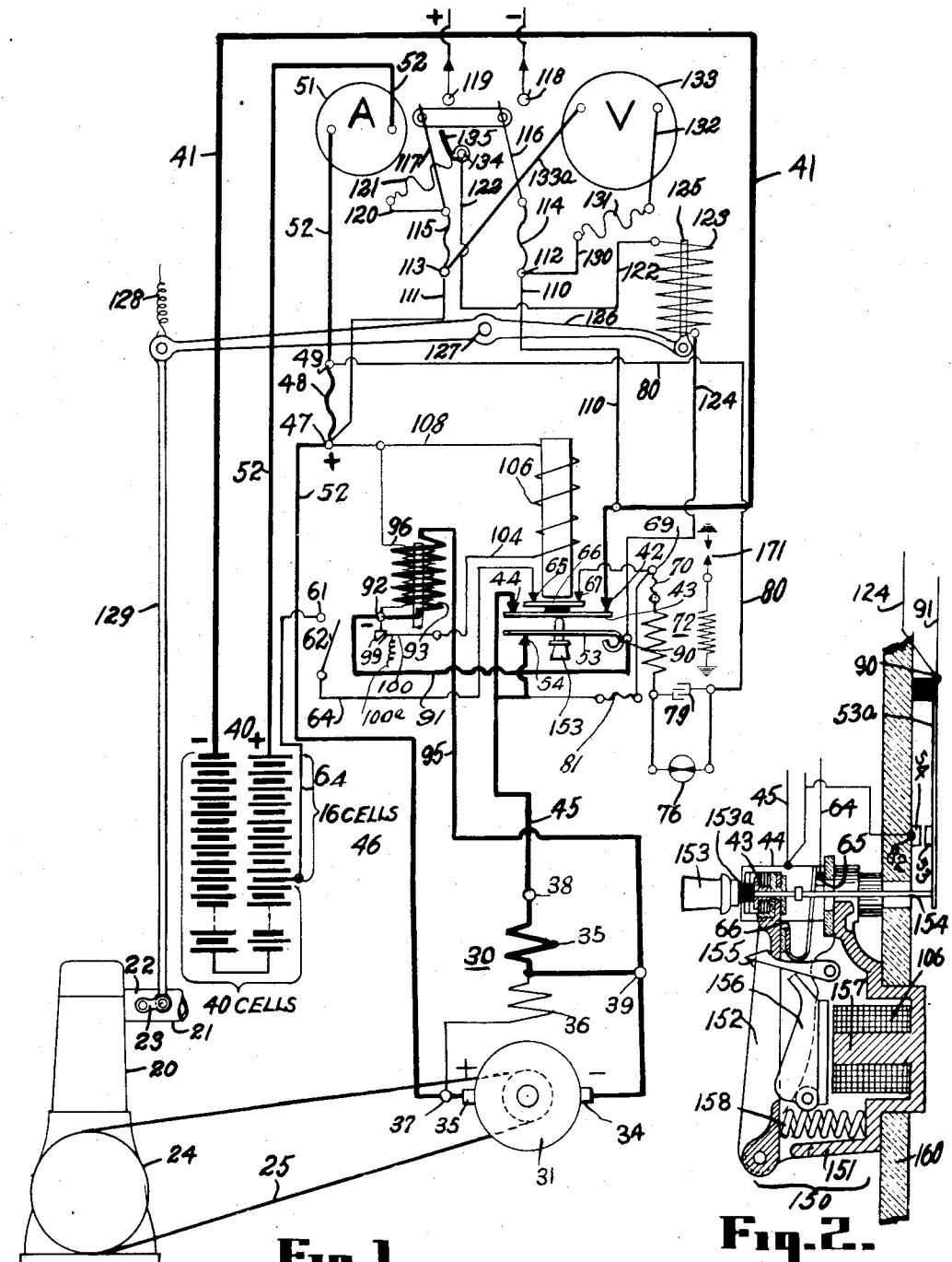

Mar. 20, 1923.

C. F. KETTERING

ELECTRICAL SYSTEM

Filed Apr. 6, 1918

1,448,749

2 sheets-sheet 1

Witnesses
Warren Schmieding
Walter W. Riedel

Inventor
Charles F. Kettering
By Kerr, Page, Cooper & Hayward
Attorneys

Mar. 20, 1923.
C. F. KETTERING
ELECTRICAL SYSTEM
Filed Apr. 6, 1918
1,448,749
2 sheets-sheet 2
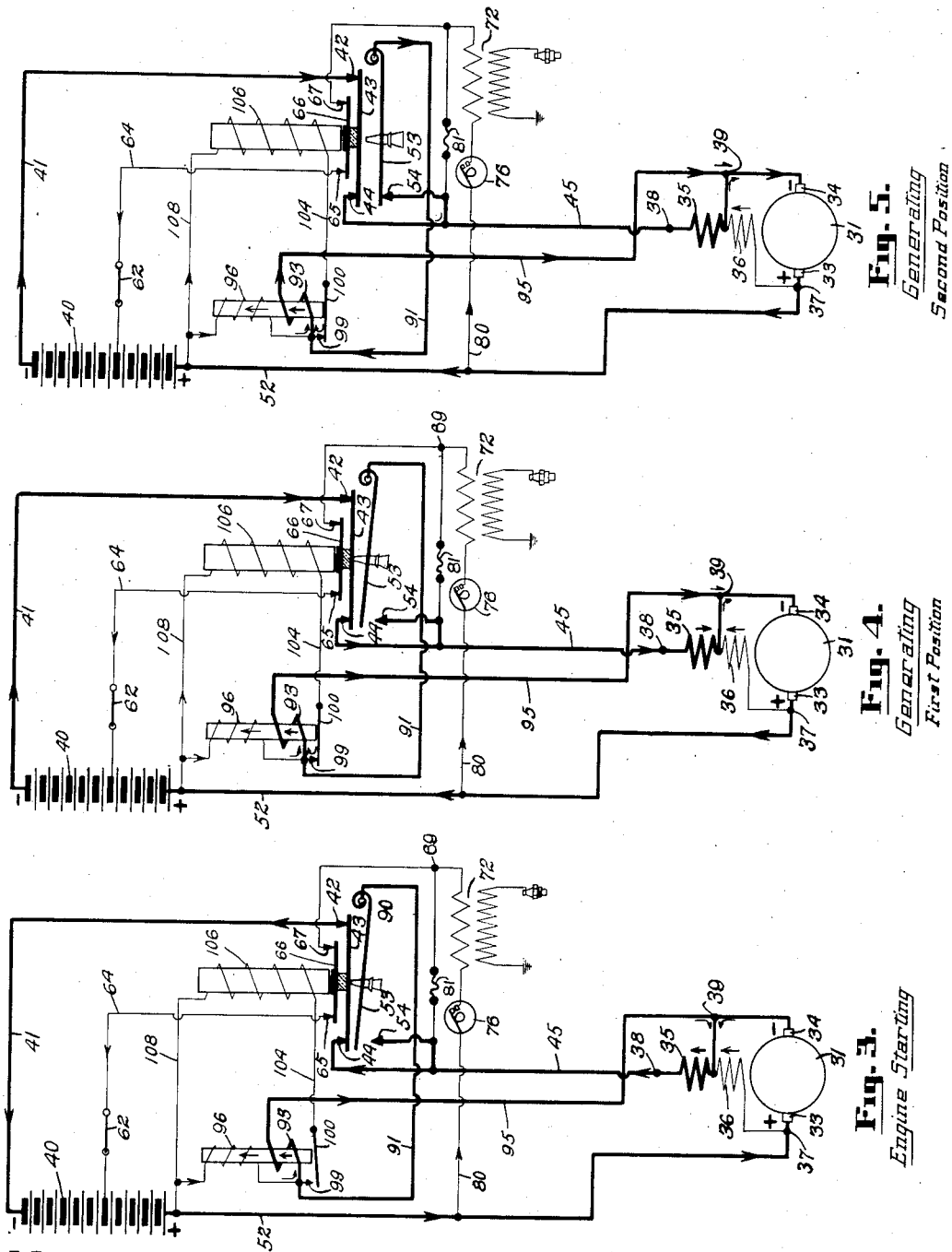
Fig. 5. Generating Second Position
Fig. 4. Generating First Position
Fig. 3. Engine Starting
Witnesses
Warren Schmieding
Mildred Pearc
Inventor
Charles F. Kettering
By J. Ralph Fehr
Attorney Patented Mar. 20, 1923.

1,448,749

UNITED STATES PATENT OFFICE.

CHARLES F. KETTERING, OF DAYTON, OHIO, ASSIGNOR, BY MESNE ASSIGNMENTS, TO DELCO-LIGHT COMPANY, OF DAYTON, OHIO, A CORPORATION OF DELAWARE.

ELECTRICAL SYSTEM.

Application filed April 6, 1918. Serial No. 226,986.

*To all whom it may concern:*

Be it known that I, CHARLES F. KETTERING, a citizen of the United States of America, residing at Dayton, county of Montgomery, and State of Ohio, have invented certain new and useful Improvements in Electrical Systems, of which the following is a full, clear, and exact description.

This invention relates to power plants of the type including an electric generator driven by an internal-combustion engine and capable of delivering electrical energy to a work circuit and to a storage device, said generator being also capable of operating as a motor to start the engine.

One object of the present invention is to provide a power plant for generating current at a relatively high voltage which is delivered at, for example 110 volts, to the work circuit, said plant including provisions for delivering a portion of the current generated to the ignition circuit of the engine at a much lower voltage suitable for ignition apparatus.

Another object is to provide an electrical device for controlling the operation of the generator in such a manner that when the work circuit is connected with the generator, the voltage will be maintained substantially constant; and when the work circuit is disconnected, the action of said controlling device will be modified so that the generator will be governed to deliver current for battery charging or other purposes at a substantially constant voltage but at a different value.

Other and further objects of the present invention will be apparent from the following description of a preferred embodiment thereof, reference being had to the accompanying drawings.

In the drawings:

Fig. 1 is a wiring diagram of a power plant embodying the present invention; and, Fig. 2 is a sectional view of one of the controlling devices.

Figs. 3, 4, and 5 are simplified wiring diagrams illustrating the operation of the present invention.

Referring to the drawings, 20 designates an internal-combustion engine having a fuel intake 21 and a throttle valve 22 controlled by the throttle lever 23. Power is delivered from the engine to the generator directly or, as shown, by means of belt 25 carried by a flywheel 24 and pulley 26 on the armature of the generator 30. Generator 30 includes armature 31 and brushes 32, 33 and 34. The generator 30 has series field windings 35 and shunt field windings 36. The brush terminals and the field windings are connected with generator terminals 37, 38 and 39.

The generator 30 is constructed to deliver current at 110 volts across the main work circuit, while the engine is running at normal speed, and to generate a current at 145 volts to 150 volts for another work circuit as for battery charging purposes, when the speed of the engine is increased.

The battery 40 consists of 56 cells connected in series, capable of delivering approximately 2 volts per cell, or 112 volts at the battery terminals, or 110 volts at the power line.

The engine starting circuit comprises line 41 leading out from the negative terminal of the battery 40 to switch terminal 42, across switch blade 43, to terminal 44 through line 45 to generator terminal 38. From terminal 38 the starting circuit continues through the generator series field windings 35, to terminal 39, and then to brush terminal 34, through armature 31 to brush terminal 33, and thence to terminal 37. At terminal 39, the current divides, a part passing through the shunt field winding 36 to terminal 37, where the current passing through the generator armature reunites with the shunt current and passes through line 52, which includes a terminal 47, fuse 48, terminal 49, and an ammeter 51, to the positive terminal of the battery 40.

The ignition circuit consists of line 64, leading out from the negative terminal of the 16th cell from the positive terminal of the storage battery through ignition switch 62 to switch terminal 65, switch member 66, and switch terminal 57, from whence it continues through resistance element 70 for protecting the ignition coil, primary winding of ignition coil 72, timer 76, line 80, and terminal 49 back to the positive terminal of the battery through ammeter 51.

Condenser 79 is connected across the timer circuit. In practice, timer 76 is mounted on the engine where it may be conveniently driven thereby, but for sake of convenience it is shown in the diagram as being isolated from the engine.

The secondary ignition circuit comprises the secondary winding of ignition coil 72, grounded upon the engine and connected to the spark plug 171, which, in actual practice, is mounted on the engine, but for sake of convenience is shown in the diagram as isolated therefrom.

The ignition balancing circuit comprises line 64, leading out from the positive terminal of the 17th cell from the positive terminal of the battery 40 through ignition switch 62 and switch blade 66 to terminal 69 from whence it continues through balancing resistance 81, terminal 44, switch member 43, terminal 42, and line 41 to the negative terminal of the battery. The purpose of this balancing circuit is to cause a discharge of the 17th to the 56th cells at a rate which will be equal to the rate of discharge of current for ignition purposes through the first to the 16th cell inclusive. It is evident, by means of the balancing circuit described, that all these cells will be discharged in approximately the same length of time.

The generating circuit comprises line 52, leading out from the positive terminal of the generator through fuse 48 and ammeter 51 to the battery 40, and thence through line 41, terminal 42, switch member 43, terminal 44, line 45, switch members 53 and 54 to the terminal 90, line 91, relay current coil 93, and line 95 leading to the negative terminal 39 of the generator. Said switch members 53 and 54 are normally closed in order to short-circuit the series-field winding and are manually held open during the engine starting operation as shown in Fig. 3, during which time the series-field winding is employed to assist the shunt field.

The relay circuit comprises, besides current winding 93 described, a voltage winding 96 connected between the terminal 92 on the negative side of the generating circuit, and terminal 47 on the positive side of the generating circuit.

The holding coil circuit of the starting switch 150, shown in Fig. 2, and which will be described later, consists of switch member 99 connected with terminal 92 on the negative side of the generating circuit, and of switch member 100, line 104, holding coil 106, and line 108, connected with terminal 47 on the positive side of the generating circuit. Switch member 100 is adapted to be attracted against the action of spring 100$^a$ by electro-magnet 103, when energized by current passing through windings 93 and 96.

Referring to Fig. 2, the starting switch 150 comprises casting 151 which supports for movement switch lever 152, upon which are mounted switch elements 43 and 66, insulated from each other and from the said lever. Lever 152 is moved into switch closing position by means of handle 153 which is supported by rod 154, which passes through insulating bushings carried by the lever 152, and terminates at a point beyond the back of the switchboard panel 160 upon which the starting switch 150 is mounted. When the lever 152 is pushed into switch closing position, and current is permitted to pass through holding coil 106, said lever will be maintained in closed position by means of armature 156 which cooperates with locking lever 155, said armature 156 being held in attracted position by means of the electro-magnet comprising holding coil 106 and core 157 carried by casting 151. When switch-lever handle 153 is pushed in toward the switchboard, rod 154 will engage member 53$^a$, which carries contact member 53, and said rod 154 will maintain switch contact members 53 and 54 out of engagement, so long as said handle 153 is maintained manually with the shoulder 153$^a$ thereof in engagement with the starting lever 152. When handle 153 is released spring arm 53$^a$ will cause the outward movement of the rod 154 and permit the contact 53 to move into touching relation with the contact 54. Should current be cut off from holding coil 106, spring 158 will cause the outward movement of switch lever 152 and the opening of switches 43 and 66.

The main work circuit includes line 111, terminal 113, fuse 115, switch blade 117, terminal 119 on the positive side; and, on the negative side, said work circuit includes line 110, terminal 112, fuse 114, switch blade 116, and terminal 118.

The throttle control circuit comprises line 120 connected with the positive side of the power circuit, over-charging resistance 121, terminal 134, which is provided with auxiliary switch clip 135, adapted to be engaged by switch blade 117. The throttle control circuit also comprises line 122, solenoid coil 123, and line 124 connected with the terminal 92 on the negative side of the generating circuit. Solenoid coil 123 cooperates with the solenoid armature 125 to operate lever 126, which is pivoted at 127 and connected with link 129 which is connected with throttle lever 23. Spring 128 tends to act against the electro-magnetic action of the solenoid, normally to hold the throttle in open position.

The volt-meter circuit comprises line 130, connected with terminal 112 on the negative side of the work circuit, volt-meter resistance 131, line 132, volt-meter 133, and line 133ª connected with terminal 113 on the positive side of the work circuit.

The operation of the power plant is as follows:—

*Engine starting operation.*—To start the engine, the ignition switch 62 is first closed, then switch-lever handle 153 is moved in as far as possible toward switchboard 160, causing the engagement of switch element 43 with terminals 42 and 44, and the engagement of switch member 66 with terminals 65 and 67, and the separation of contacts 53 and 54. When this operation has been effected, and, with handle 153 still held manually in the aforesaid position, current from the battery will flow through the engine starting circuit described, to cause the generator to operate as a motor for starting the engine. While the generator is acting as a motor the series field windings are energized by reason of the fact that the short circuit around the series field windings is broken, since contacts 53 and 54 are held open. While the starting switch is held closed, the ignition circuit described will be completed and ignition will be furnished for starting purposes. The circuits established during engine starting are shown in simplified form in Fig. 3.

*Generating operation.*—After the engine becomes self-actuating and the machine 30 operates as a generator, current will flow from the generator through the generator circuit described to the storage battery. Relay windings 93 and 96 will be energized to cause the attraction of switch element 100 into engagement with element 99 by means of magnet 103, as illustrated in Fig. 4. When this operation has taken place current will flow across the generating line through holding coil 106, thereby causing the attraction of holding-coil armature 156 and the movement of switch-holding lever 155 into holding position. During this generating operation, while the starting switch is still manually held in closed position, it will be evident that the series field winding is opposing or bucking the shunt field winding. This condition is illustrated in Fig. 4. However, as soon as it becomes evident to the operator that the holding coil 106 is energized sufficiently to hold switch lever 152 and switches 66 and 43 in closed position, he will release the switch lever handle 153, and as explained above, contact 53 will engage 54 to short circuit the series field winding, as shown in Fig. 5, and as a result of this the shunt field will exert its full magnetic effect and the generator will operate with shunt characteristics.

Switch elements 43 and 66 being now in closed position, the ignition circuit and the ignition balancing circuit will be completed and operate in the manner described.

*Battery discharging operation.*—When the engine is running and the generator is delivering current to the work circuit, the battery after being charged to a certain extent will float across the work circuit to take care of the overload. When the engine stops, the battery alone furnishes current to the work circuit. To prevent a discharge of the battery back through the generator, a reversal of current takes place through the relay, thereby causing the de-energizing of magnet 103, resulting in contact 100 dropping away from contact 99 by force of gravity and by the force exerted by the spring 100ª. When this operation takes place the circuit through the holding coil 106 will be broken and switch lever 152 will be moved to open position by means of spring 158, thereby breaking the generator circuit, ignition circuit, and ignition balancing circuit, causing the engine to stop and preventing the discharge of the batteries through either the generator, the ignition circuit or the ignition balancing circuit.

The work circuit will be completed by moving switch blades 116 and 117 into contact with terminals 118 and 119. When the work circuit is completed, current may be taken from the battery, and when the engine is running current may be supplied by the generator alone or by the generator and battery combined. When both sources of current supply are being used, it is evident that there will not be a reversal of current through the relay winding 96, since current from both sources will unite at terminals 47 and 42 with which the work circuit is connected.

*Operation of throttle control.*—The throttle 22 is normally in open position, when the engine is running, and the generator is furnishing power to the work circuit switch blades 116 and 117 being closed. Should the voltage across the work circuit exceed, for example, 110 volts, current passing through solenoid winding 123 will cause the attraction of armature 125, which will effect the throttling down of the engine in the manner described, with a consequent reduction of voltage. Under these conditions the throttle controlling system is designed to maintain an approximately constant voltage of 110 volts across the work circuit. When it is desired, however, to charge the battery at a more rapid rate than could be obtained by an E. M. F. of 110 volts, the power circuit is broken by moving switch blades 116 and 117 out of contact with terminals 118 and 119, respectively. This operation causes the separation of elements 117 and 135 which results in the breaking of the short-circuit around overcharging resistance 121. By virtue of combining resistance 121 with the resistance of the solenoid winding 123, a higher voltage between terminal 42 on the negative side of the generator circuit and 47 on the positive side will have to be maintained before the solenoid will begin to throttle down the engine. This will result in maintaining a practically constant voltage of, for example, 145 volts, for the rapid charging of the battery when the work circuit is broken.

It is apparent from the foregoing that when the work circuit is disconnected the action of the throttle control will be automatically modified to control the generator so as to obtain current at substantially constant voltage at a different value. While the embodiment of the invention described and illustrated discloses a construction whereby when the work circuit is broken, the voltage of the current generated will be automatically maintained at a higher value, it is to be understood that the invention is not to be limited to obtaining a higher constant value, but that the invention includes the automatic modification of the controlling device upon the opening of the work circuit so as to obtain regulation to give constant voltage at any different value from that existing when the work circuit is connected. Furthermore it is to be understood that the purpose for which the action of the controlling device is modified may be other than to obtain a different voltage for charging purposes, as, for example, for delivering current at a different voltage to some other work circuit.

While the throttle control forming a part of the present invention is described as applied to an internal-combustion engine, the application is not to be thus limited, since it is apparent that the said throttle control may be applied to steam engines, or to any other energy transforming device which can be used to drive a generator.

While the electrical system embodied in this invention is described as being a 110 volt system, it is to be understood that the invention may be applied to systems delivering current at other voltages.

While the form of mechanism herein shown and described constitutes a preferred embodiment of one form of the invention, it is to be understood that other forms might be adopted, and various changes and alterations made in the shape, size, and proportion of the elements therein without departing from the spirit and scope of the invention.

What I claim is as follows:

1. In an electrical system, the combination with an internal-combustion engine and a generator driven thereby; of a storage battery comprising a plurality of cells; an ignition device for the engine; electrical connections between the generator and battery to provide for the charging of the latter; electrical connections between the ignition device and a certain number of storage cells; and means operating during the supplying of ignition current by said portion of cells for causing the discharge of the remaining portion of cells at the same rate as the discharge of the ignition supplying operation.

2. In an electrical system, the combination with an internal-combustion engine and a generator driven thereby; of a storage battery including a plurality of cells; an ignition device; electrical connections between the generator and battery for providing for the charging of the latter; electrical connections providing an ignition circuit which includes a portion of said storage cells; an ignition timer and the primary winding of the ignition coil; and electrical connections providing a balancing circuit including a resistance element in series with the remaining cells, said resistance element being so constructed and connected as to discharge the remaining storage cells at the same rate as the cells supplying current for ignition.

3. In an electrical system, the combination with an internal-combustion engine and a generator driven thereby; of a storage battery comprising a plurality of cells; electrical connections between the battery and generator; an ignition circuit including ignition devices and a certain portion of the battery cells; a balancing circuit including the remaining portion of the battery cells; and means operable upon reversal of current to open the generator circuit, the ignition circuit, and the balancing circuit.

4. In an electrical system, the combination with an internal-combustion engine and a generator having a series-field and a shunt-field; a normally closed short-circuit around the series field of the generator; a battery including a plurality of storage cells; connections between the generator and battery providing for the charging of the latter; an ignition circuit including ignition devices and a certain portion of the storage cells; a balancing circuit including the remaining storage cells; means to close the generator circuit, the ignition circuit, and the balancing circuit, and to open the short-circuit around the series field of the generator; means for maintaining the generator circuit, ignition circuit, and balancing circuit closed during the battery charging operation; and means to automatically open the generator, ignition, and balancing circuits in case of discharge of the battery through the generator.

5. In an electrical system, the combination with an internal-combustion engine and a generator having a series-field and a shunt-field; a normally closed short-circuit around the series field of the generator; a battery including a plurality of storage cells; connections between the generator and battery providing for the charging of the latter; an ignition circuit including ignition devices and a certain portion of the storage cells; a balancing circuit including the remaining storage cells; means to close the generator circuit, the ignition circuit, and the balancing circuit, and to open the short circuit around the series-field of the generator; means for maintaining the generator circuit, ignition circuit, and balancing circuit closed when the engine is running; and means for automatically releasing the said maintaining means upon the stopping of the engine.

6. In an electrical system, the combination with an engine; of a dynamo having a plurality of field circuits operable as a motor for starting the engine, or as a generator with certain field circuits operative; a storage battery; means for connecting the dynamo with the storage battery; a manually operable member for actuating said connecting means and for bringing other of the dynamo field circuits into effective operation in order that the dynamo may operate as a high torque motor; electro-magnetic means for maintaining said connecting means in operative position, while permitting said member to return to inoperative position; and automatic means for rendering said electro-magnetic means operative when the dynamo output exceeds a certain value, or inoperative when the dynamo output falls below a certain value.

7. In an electrical system, the combination with an engine; of a dynamo having a plurality of field circuits operable as a motor for starting the engine, or as a generator with certain field circuits operative; a storage battery; an ignition system for the engine; means for connecting the dynamo and ignition system with the storage battery; a manually operable member for actuating said connecting means and for bringing other of the dynamo field circuits into effective operation in order that the dynamo may operate as a high torque motor; electro-magnetic means for maintaining said connecting means in operative position, while permitting said member to return to inoperative position; and automatic means for rendering said electro-magnetic means operative when the dynamo output exceeds a certain value, or inoperative when the dynamo output falls below a certain value.

8. In an electrical system, the combination with an engine; of a dynamo having shunt and series field circuits, and operable as a motor for starting the engine or as a generator with the shunt field only operative; a storage battery; an ignition system for the engine; a lever operable to connect the battery with the dynamo and with the ignition system; manual means movable in one direction to place said lever in operative position and to bring said series field circuit into effective operation, said manual means being movable independently of said lever to render said series field ineffective; electro-magnetic means for maintaining said lever in operative position; resilient means for restoring said lever to inoperative position; and automatic means for rendering said electro-magnetic means operative when the dynamo output exceeds a certain value, or inoperative when the dynamo output falls below a certain value.

9. In an electrical system, the combination of a prime mover and a generator driven thereby to supply current to a plurality of translating devices; means responsive to the voltage of the current generated for controlling the speed of the prime mover in order to maintain the voltage substantially constant; and means operative upon the disconnection of one of the translating devices to modify the action of the first-mentioned means, whereby the speed of the prime mover will be regulated to cause current to be supplied to the remaining translating devices at a predetermined different voltage.

10. In an electrical system, the combination of a prime mover and a generator driven thereby; means responsive to the voltage of the current generated for controlling the speed of the prime mover in order to maintain the voltage substantially constant; and means to modify the action of the first-mentioned means, whereby the speed of the prime mover will be regulated to cause current to be generated at a predetermined different voltage.

11. In an electrical system, the combination of a prime mover and a generator driven thereby to supply current to a plurality of translating devices; means responsive to the voltage of the current generated for controlling the speed of the prime mover in order to maintain the voltage substantially constant; and means operative upon the disconnection of one of the translating devices to vary the resistance of the first-mentioned means, whereby the speed of the prime mover will be regulated to cause current to be supplied to the remaining translating devices at a predetermined different voltage.

In testimony whereof I affix my signature.

CHARLES F. KETTERING.

Witnesses:
J. W. McDonald,
Edwin James.